United States Patent
Lucchi

(10) Patent No.: US 8,963,383 B2
(45) Date of Patent: Feb. 24, 2015

(54) STATOR SECTION FOR AN AXIAL FLUX ELECTRIC MACHINE WITH LIQUID COOLING SYSTEM

(76) Inventor: Fabio Lucchi, Rimini (IT)

( * ) Notice: Subject to any disclaimer, the term of this patent is extended or adjusted under 35 U.S.C. 154(b) by 884 days.

(21) Appl. No.: 13/130,157

(22) PCT Filed: Nov. 25, 2009

(86) PCT No.: PCT/IB2009/007570
§ 371 (c)(1),
(2), (4) Date: May 19, 2011

(87) PCT Pub. No.: WO2010/061278
PCT Pub. Date: Jun. 3, 2010

(65) Prior Publication Data
US 2011/0221287 A1    Sep. 15, 2011

(30) Foreign Application Priority Data

Nov. 28, 2008 (IT) .............................. RN2008A0055

(51) Int. Cl.
*H02K 3/24* (2006.01)
*H02K 3/46* (2006.01)
*H02K 9/19* (2006.01)
(52) U.S. Cl.
CPC .. *H02K 3/24* (2013.01); *H02K 3/46* (2013.01); *H02K 9/19* (2013.01)
USPC .............................................. 310/54; 310/64
(58) Field of Classification Search
USPC .......................... 310/164, 194, 52, 54, 57, 64
See application file for complete search history.

(56) References Cited

U.S. PATENT DOCUMENTS

| | | | |
|---|---|---|---|
| 3,435,262 A | 3/1969 | Bennett et al. | |
| 3,963,950 A | 6/1976 | Watanabe et al. | |
| 4,749,921 A | 6/1988 | Chitayat | |
| 5,304,883 A * | 4/1994 | Denk | 310/180 |
| 6,211,595 B1 * | 4/2001 | Nose | 310/216.111 |
| 6,236,131 B1 | 5/2001 | Schafer | |
| 6,278,203 B1 | 8/2001 | Novak et al. | |
| 6,304,011 B1 | 10/2001 | Pullen et al. | |
| 6,800,971 B1 | 10/2004 | Mangold et al. | |
| 7,332,837 B2 | 2/2008 | Ward et al. | |
| 7,538,457 B2 * | 5/2009 | Holmes et al. | 310/54 |
| 2002/0149274 A1 | 10/2002 | Pullen et al. | |
| 2004/0012272 A1 | 1/2004 | Houle et al. | |
| 2005/0012409 A1 | 1/2005 | Philipparte | |
| 2005/0035673 A1 | 2/2005 | Lafontaine | |

FOREIGN PATENT DOCUMENTS

DE            24 49 090 A1     4/1975
DE    10 2007 013051 A1     9/2008

(Continued)

*Primary Examiner* — Dang Le
(74) *Attorney, Agent, or Firm* — Pearne & Gordon LLP

(57) ABSTRACT

In a stator section of an axial flux electric machine with liquid cooling system, a toroidal core having an inside cylindrical surface and an outside cylindrical surface coaxial with each other along a reference axis, is provided along its annular center line with a plurality of electrical conductor coils spaced from each other and each placed around the core and having a first, a second, a third and a fourth face. Each cooling duct section produces a movement of the liquid coolant from a first to a second base surface of the core and is located between faces of two consecutive coils. At least a face of each coil is adjacent to and in contact with at least one cooling duct section.

23 Claims, 10 Drawing Sheets

(56) References Cited

FOREIGN PATENT DOCUMENTS

| | | | |
|---|---|---|---|
| GB | 1117433 A | 6/1968 | |
| WO | 89/05538 A1 | 6/1989 | |
| WO | 94/22204 A1 | 9/1994 | |
| WO | 0147089 A2 | 6/2001 | |
| WO | 0215229 A1 | 2/2002 | |

* cited by examiner

STATOR SECTION FOR AN AXIAL FLUX ELECTRIC MACHINE WITH LIQUID COOLING SYSTEM

TECHNICAL FIELD

This invention relates to a stator section for an axial flux electric machine with liquid cooling system.

BACKGROUND ART

Generally speaking, an electric machine comprises a stationary part, commonly referred to as "stator section" (or simply "stator"), and a mobile part, both equipped with windings of electrical conductor and/or sources of a magnetic and/or electromagnetic field. Together with the machine structure, these windings and sources always form both an electric circuit (defined as an assembly of structures and materials with an electric current and/or an electric field flowing through it) and a magnetic circuit (defined as an assembly of structures and materials with a magnetic field flowing through it). In order to operate, the electric machine uses electromagnetic induction (produced by the concatenation of magnetic field fluxes with the electric windings) and/or electromagnetic forces (generated by the magnetic/electromagnetic field sources on the electric windings with current flowing through them and/or on the other magnetic/electromagnetic field sources). Some electric machines (for example, electric motors) can convert the electric current circulating in the electric windings into movement of the mobile part relative to the stator section. Other electric machines (for example, generators) can generate electric current and/or electromagnetic force in the electric windings using the motion of the mobile part relative to the stator section. An electric machine of this kind can normally be used in both ways (that is, as a generator and as a motor). The windings can be made around a core of magnetic material in order to optimize the effect of magnetic flux concatenation with the electric windings themselves.

In one type of electric machine, the mobile part is a rotating member, also known as "rotor section" (or simply "rotor"). The axis of rotation of the rotor section is particularly important and is usually used as the reference and/or symmetry axis for the structure of the electric machine. As the rotor section moves relative to the stator section, portions of the magnetic field sources and portions of the electric windings face each other at a certain distance defining a gap between the rotor section and the stator section. There is a geometrical relation between the axis of rotation of the rotor section and the pattern of the flux lines of the magnetic field, generated by the sources, in the gap between the stator section and the rotor section. Based on this geometrical relation, machines of this kind can be broadly divided into two categories: radial flux electric machines and axial flux electric machines.

Of these two types of electric machines, radial flux electric machines are the most widespread and well known.

In this specification, the term radial flux electric machine is used to mean: an electric machine where the arrangement of the magnetic field sources and of the electric windings with which the magnetic field is concatenated, is such that in the gap between the stator section and the rotor section (where source portions face winding portions during the motion of the rotor section) the magnetic field flux lines can be likened to line segments perpendicular to the axis of rotation of the rotor section and arranged radially with respect to the axis of rotation itself.

The term axial flux electric machine, on the other hand, is used to mean: an electric machine where the arrangement of the magnetic field sources and of the electric windings with which the magnetic field is concatenated, is such that in the gap between the stator section and the rotor section (where source portions face winding portions during the motion of the rotor section) the magnetic field flux lines can be likened to line segments parallel to the axis of rotation.

This invention addresses electric machines of the axial flux type.

The most common type of axial flux electric machine comprises: a generally toroidally-shaped stator section and at least one disc-shaped rotor section facing one of the two bases of the toroid constituting the stator section. In some cases, the machine has two rotor sections, each facing one of the bases of the stator section. Some electric machines may comprise two or more stator sections, alternated with respective discoidal rotor sections. Stator section and rotor section are coaxial along the axis of rotation of the rotor section. The rotational shaft of the rotor section generally passes through the central hole in the toroid constituting the stator section.

Usually, the rotor section mounts the magnetic field sources, preferably in the form of permanent magnets, while the stator section mounts the electric windings with which the magnetic field is concatenated. The magnetic field sources are normally distributed in a circular crown of the rotor disc that faces one of the bases of the toroid constituting the stator section.

The stator section of an axial flux electric machine usually comprises a toroidally-shaped core having a cylindrical outside lateral surface and a cylindrical inside lateral surface, coaxial with each other along an axis that coincides with the axis of rotation of the rotor section. Along this axis, the core is delimited by a first and a second base. The core is made of a magnetic (preferably ferromagnetic) material. The electric windings are in the form of a plurality of coils, equally spaced from each other along the annular centre line of the core, and electrically connected to each other in various ways. Each coil has a through hole around which the conductor that forms it is wound. The solid part of the core goes through the coil by way of the through hole in the coil itself. The coil thus has a first side extending along the outside cylindrical surface, a second side extending along the inside cylindrical surface, a third side transversal to the first two sides and joining them across one of the two bases of the core, and a fourth side transversal to the first two sides and joining them across the other of the two bases of the core. The distance between the two cylindrical surfaces of the core is greater than the distance between the two bases, and the first and second sides are shorter than the third and fourth sides. Since the machine is of the axial flux type, the third and/or the fourth side of each coil (extending from the outside cylindrical surface to the inside cylindrical surface on the base surfaces of the core) are the portions of the winding that face the magnetic field sources (for example, the magnets) during rotation of the rotor section. Thus, they cross the magnetic field in a region where the flux lines of the magnetic field are parallel to the axis of rotation of the rotor section (this axis coinciding with the shared axis of the two cylindrical surfaces of the core) and they are substantially perpendicular to the flux lines in that region. For this reason, the third and fourth sides are called the "active sides" of the respective coil (that is to say, the sides which, in the case of a motor, when current flows through them, are subject to magnetic forces that are able to induce rotation of the rotor section). The first and the second sides, on the other hand, are referred to as the "heads" of the coils. Usually, the coils have a radial orientation, that is to say the four sides extend along a closed curve that lies in a plane which in turn contains the axis of the two lateral cylindrical surfaces of the core. In particular, the two active sides—i.e. the third and the fourth side—extend in a radial direction, while the heads—i.e. the first and the second side—are parallel to the axis.

On account of the thickness of the electrical conductor winding, each of the four sides of a coil extends away from the core for a certain distance along the perpendicular to the surface of the core on which the side itself is located.

The base surfaces of the core may be flat (each one lying in a plane perpendicular to the shared axis of the inside and outside lateral cylindrical surfaces of the core). In this case, between the two third sides of two consecutive coils and between the two fourth sides of two consecutive coils there are empty spaces (air gaps). In this case, the core of the stator section of an axial flux machine is said to be "slotless". Alternatively, the space between the third or the fourth side of one coil and, respectively, the third or the fourth side of the consecutive coil along the annular centre line of the core may be filled by a protuberance (also known as "tooth"), which protrudes from the core along the shared axis of the lateral cylindrical surfaces for a certain distance and extends in length from the outside lateral surface to the inside lateral surface. The third and/or the fourth side of each coil is thus positioned inside a groove (or "slot") between two consecutive teeth. In this case, the core of the electric machine is said to be "slotted". The teeth are also made of a magnetic material and make it possible to minimize the magnetic reluctance of the gap between one coil and the next in the active region of the machine (that is, in the region of the "active sides" of the coils), thus maximizing the efficiency of the electric machine. Usually, the teeth are made as a single part with the core.

Whether the cores are slotted or slotless, there is always an empty space (air gap) between the heads (first and second sides) of two consecutive coils.

To reduce eddy currents in the core (these currents, which reduce the efficiency of the electric machine, tend to be generated in the core along rings that surround the magnetic field lines), the core is usually made by winding a metal strip spirally on itself around the shared axis of the lateral cylindrical surfaces of the core itself. In this way, the interfaces between one strip and the next are distributed crossways relative to the path that would be followed by the eddy current rings, thus tending to break it and to reduce its effect. To make the teeth as a single part with the core, the strip, before being wound on itself or during the winding operation, is punched in such a way that slots and teeth are automatically formed when it is wound on itself.

The electric machine also comprises a casing (or enclosure) which the stator section is usually fixed to and which surrounds at least the latter around its axis.

During operation of the electric machine, power losses occur in the electrical circuit and in the magnetic circuit and, more specifically:
  "copper losses" (that is to say, power losses in the electrical circuit of the machine, due to the Joule effect created mainly by the current flowing through the windings and in the electrical conductors);
  "core losses" (that is to say, power losses in the magnetic circuit of the machine due mainly to the magnetic hysteresis of the magnetic materials and to eddy currents generated in the active parts of the machine, especially in the stator section, that is, core and coils).

These power losses result in heat being given off. This heat must be removed to the surrounding atmosphere as effectively as possible because excessively high temperatures in the active parts of the machine (core and coils in the stator section) can damage and reduce the efficiency of the electrically insulating components, which are the most sensitive in terms of temperature limits.

Usually, the heat is removed from the contact surface between the stator section and the casing that houses the active parts of the machine and is dispersed into the atmosphere by the casing itself.

United States patent document U.S. Pat. No. 7,332,837 B2 discloses a stator for an axial electric machine with an attached cooling system. More specifically, the stator section comprises a toroidal core. Coils of electrical conductor are interspersed along the annular centre line of the core, each coil being spaced from the others and lying in a radial plane containing the axis of the toroid. The stator section comprises an outer annular casing of metal (preferably aluminium), which surrounds the core from the outside and remains coaxial with the core itself. The casing has teeth extending radially inwards into the gap between the outer head of one coil and the outer head of the next coil along the annular centre line of the core (that is, between the first side of one coil and the first side of the next coil, the first side of a coil being, as mentioned above, the one that extends on the outer cylindrical surface of the core). The teeth on the casing act as cooling fins. The spaces between the teeth and the coils are preferably filled with a filling material having good thermal conductivity. The body of the annular casing has an interior cooling channel, also annular in shape, that circumferentially engages the outside of both the core and the coils. A liquid coolant flows inside the cooling channel.

The stator section for a liquid-cooled axial flux electric machine as described above is not free of disadvantages.

In particular, the side faces of the outer heads of the coil are cooled only by contact with the metal teeth of the casing, while only the outer end of the head is affected more closely by the passage of the liquid coolant. In addition, the casing has a complex structure that is difficult to make. Machining the side of the casing that faces the outer heads of the coils is a particularly complex process. The interior annular channel is also difficult to make and must be adapted for each different stator size and type.

DISCLOSURE OF THE INVENTION

In this context, the main technical purpose of this invention is to provide a stator section for an axial flux electric machine with liquid cooling system that overcomes the above mentioned disadvantages of prior art.

In particular, this invention has for an aim to provide a stator section for an axial flux electric machine with liquid cooling system that permits more effective cooling especially of the electrical conductor coils. Another aim of the invention is to provide a stator section for an axial flux electric machine with liquid cooling system that is versatile and adaptable to most stator structures for axial flux electric machines.

Yet another aim of the invention is to provide a stator section for an axial flux electric machine with liquid cooling system that is easy to make.

The stated technical purpose and specified aims, as well as other aims which are more apparent in the description which follows, are substantially achieved, in accordance with the invention, by a stator section for an axial flux electric machine with liquid cooling system having the structural and functional features described in the appended independent claims, further embodiments of the same being described in the dependent claims.

BRIEF DESCRIPTION OF THE DRAWINGS

Other characteristics and advantages of the invention are more apparent in the description which follows, with reference to a preferred, non-limiting, embodiment of a stator section for an axial flux electric machine with liquid cooling system, as illustrated in the accompanying drawings, in which.

DETAILED DESCRIPTION OF THE PREFERRED EMBODIMENTS OF THE INVENTION

Figure 1:
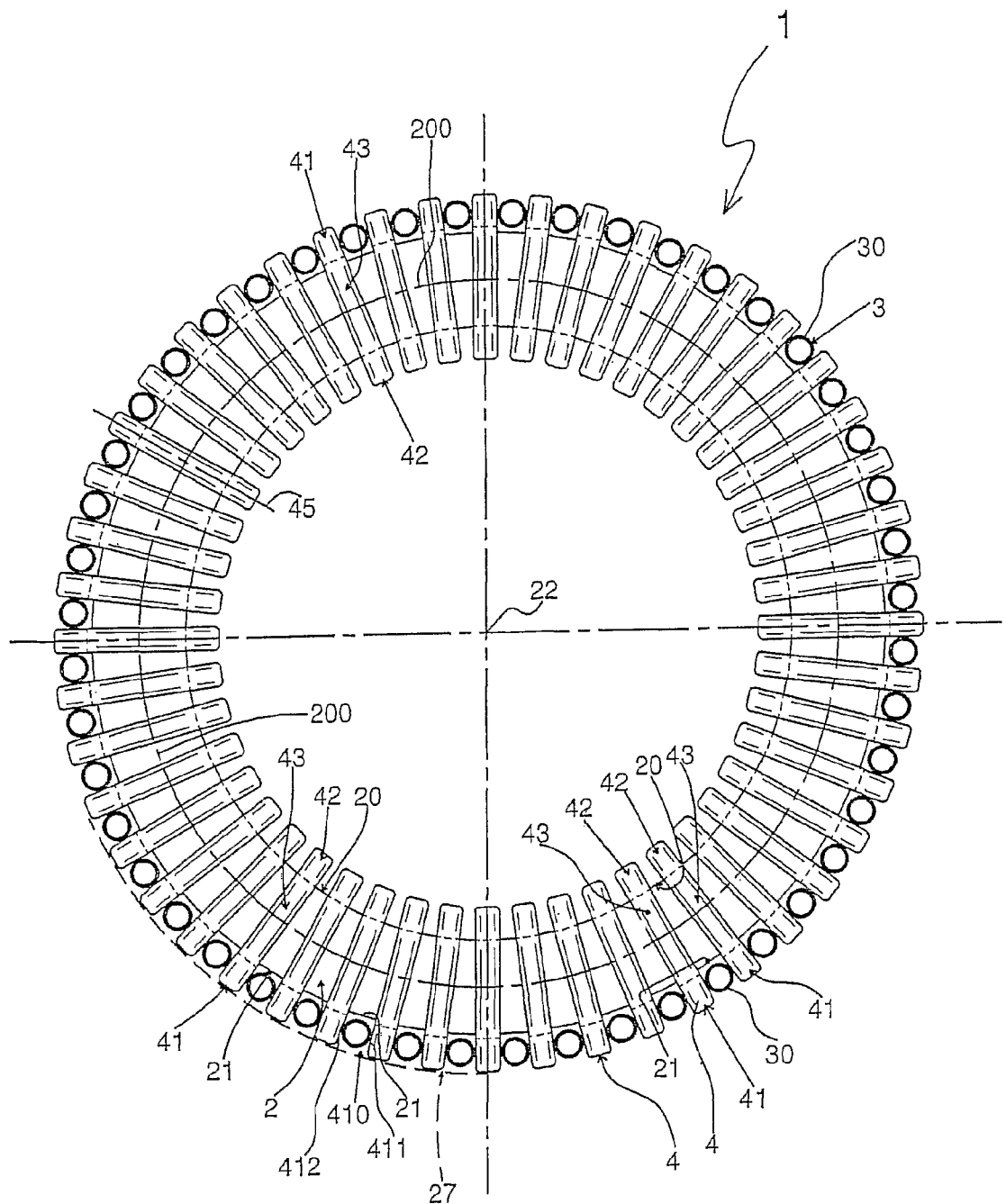
FIG. 1 is a plan view, with some parts cut away in order to better illustrate others, of an embodiment of the invention, the figure illustrating both an "unslotted" (or "slotless") core and a "slotted" core.

In the description which follows and in the drawings, identical or corresponding parts in the different embodiments described are, unless otherwise specified, identified by the same reference characters.

With reference to the accompanying drawings, the numeral 1 denotes a stator section for an axial flux electric machine with liquid cooling system.

The stator section 1 comprises a toroidal core 2 having an inside cylindrical surface 20 and an outside cylindrical surface 21 coaxial with each other along a reference axis 22 which is to be made coincide with the axis of rotation of a rotor section of an axial flux electric machine.

The stator section 1 also comprises a plurality of electrical conductor coils 4 spaced from each other and distributed along the annular centre line 200 of the core 2.

Figure 2:
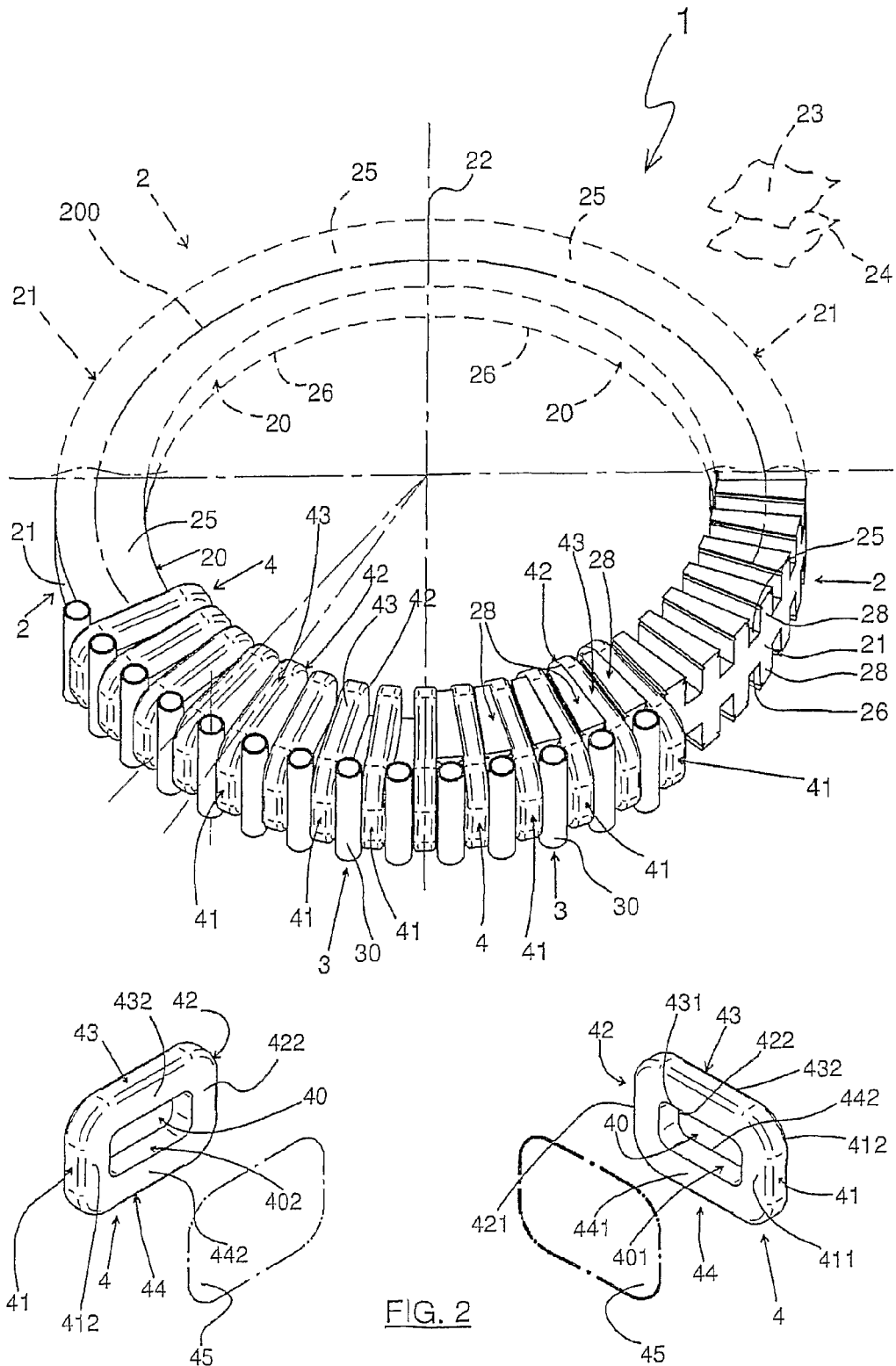
FIG. 2 is a schematic perspective view, with some parts cut away in order to better illustrate others, of other embodiments corresponding to the embodiment of FIG. 1. In particular, the bottom left-hand quarter shows a stator structure where the core is unslotted or slotless, while the bottom right-hand quarter shows a stator structure where the core is slotted. The top half of the drawing, in dashed lines, shows the geometry of the core from which, for simplicity, in the top right-hand quarter, the teeth and slots extending from the bottom right-hand quarter have been omitted. Also shown, in a schematic exploded perspective view, are two coils (one for each of the two bottom quarters) and, next to each coil, the respective line of perimetric extension shown in dot-dashed lines.
Figure 7:
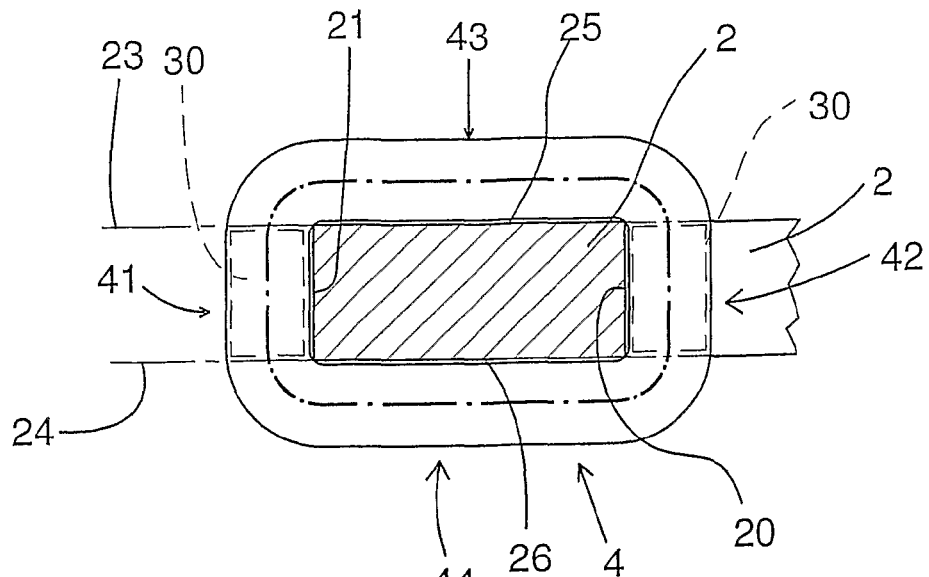
FIG. 7 illustrates details and relations between the parts in a section plane transversal to the annular centre line of the core cutting all four sides of a coil.
Figure 8:
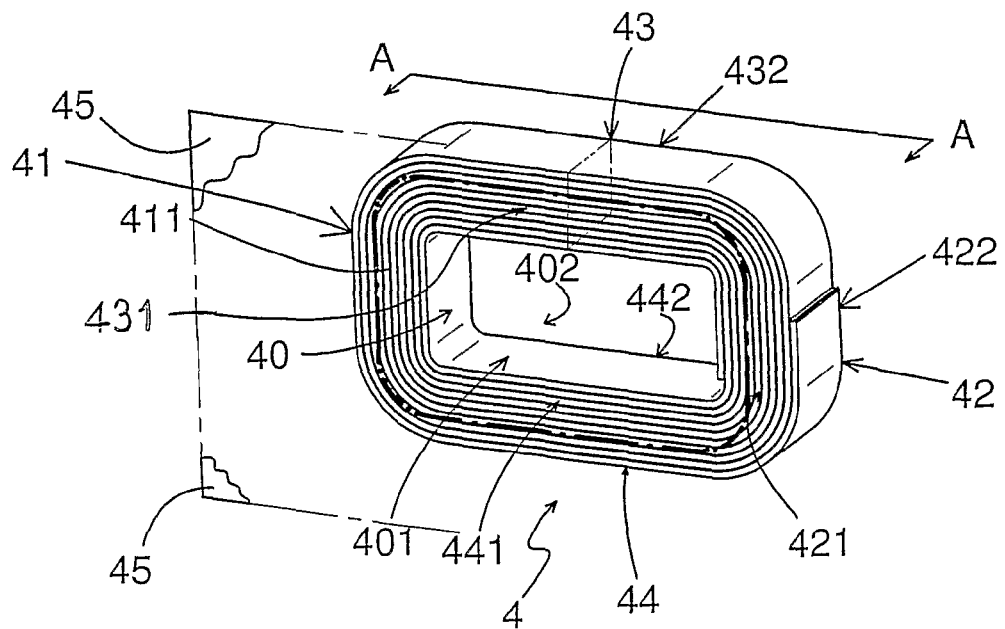
FIG. 8 illustrates a coil forming part of the stator section of the electric machine according to the invention in a schematic perspective view interrupted at the conductor area from which the electrical contacts extend.

With reference in particular (but not only), to FIGS. 2, 7 and 8, each coil 4 has the shape of a solid with a hole 40 passing through it. Thus, each coil 4 has an individual through hole 40. Each coil 4 can be divided into four consecutive sides 41, 42, 43, 44 running round the through hole 40. Each coil 4 is placed around the core 2 with a first side of it 41 lying on the outside cylindrical surface 21, a second side of it 42 lying on the inside cylindrical surface 20 and a third and fourth side of it 43 and 44 lying transversally to the first and second sides 41 and 42.

Thus, the solid part of the core 2 passes through each coil by way of the respective through hole 40.

When the stator section 1 is installed in an axial flux electric machine, the reference axis 22 coincides with the axis of rotation of a rotor section of the electric machine and, as already mentioned above in the prior art section with regard to axial flux electric machines, the third and fourth sides 43, 44 of a coil 4 are its active sides (since they cross the magnetic field generated by the sources on the rotor section in a region where the flux lines of the magnetic field are parallel to the axis of rotation of the rotor section, that is to say, to the reference axis 22), while the first and second sides 41, 42 of a coil 4 are the heads. The first side 41, being located on the outer cylindrical surface 21, on the outside of the core ring 2, may also be referred to as the "outer head" of the coil 4. The second side 42, being located on the inner cylindrical surface 20, on the inside of the ring formed by the core 2 (that is to say, in the central hole of the ring formed by the core 2), may also be referred to as the "inner head" of the coil 4. Hereinafter, the term "head" (without further specification) will be used to refer to either the first or the second side 41, 42 of a coil 4, respectively. The term "inner head" and the term "outer head" (without further specification) will be used to refer either to the second side 42 or to the first side 41 of a coil 4, respectively.

The stator section 1 according to the invention further comprises liquid cooling means 3 which in turn comprise a plurality of cooling duct sections 30 through which a liquid coolant flows.

Each cooling duct section 30 is in one of the following two alternative conditions:

either it is interposed between the first side 41 of two consecutive coils 4 along the annular centre line 200 of the core 2 at a radial distance from the reference axis 22 greater than or equal to the radius of the outside cylindrical surface 21;

or it is interposed between the second sides 42 of two consecutive coils 4 along the annular centre line 200 of the core 2 at a radial distance from the reference axis 22 less than or equal to the radius of the inside cylindrical surface 20.

Thus, a cooling duct section 30 may be located either on the outside of the ring formed by the core 2 (preferably in contact with the outside cylindrical surface 21), interposed between the outer heads (the first sides 41) of two consecutive coils 4 along the annular centre line 200 of the core 2, or it may be located on the inside of the ring formed by the core 2, that is to say, in the central hole of the core 2 (preferably in contact with the inside cylindrical surface 20), interposed between the inner heads (the second sides 42) of two consecutive coils 4 along the annular centre line 200 of the core 2.

Each cooling duct section 30 produces a movement of the liquid coolant from a first to a second reference plane 23, 24, both perpendicular to the reference axis 22, spaced from each other along the reference axis 22 and corresponding, respectively, to at least one portion of a first base surface 25 of the core 2 and at least one portion of a second base surface 26 of the core 2.

At least the first or the second side 41, 42 of each coil 4 is adjacent to and in contact with at least one respective cooling duct section 30 of the plurality of cooling duct sections 30.

Thus, at least one of the heads of each coil 4 (its first or second side 41, 42) is in contact with a cooling duct section 30. This head (the first side 41 or the second side 42) can thus be effectively cooled by the liquid coolant along the entire extension of the head between the first and the second reference plane 23, 24, as the cooling duct section 30 makes the liquid coolant move from the first to the second reference plane 23, 24. The high thermal conductivity of the metallic material (usually copper) used to make the electrical conductor which is wound to form the coil 4, also allows the heat produced on the other sides of the coil 4 to be dissipated to the liquid coolant flowing in the cooling duct section 30.

The invention overcomes the problem of effectively cooling the stator section 1 without reducing the electromagnetic efficiency of the stator section and of the axial flux machine in which it is to be installed. That is because each cooling duct section 30 is located in the empty space between the heads of two consecutive coils 4, the cooling duct section 30 being structured in such a way that the liquid coolant is made to flow alongside the head which the cooling duct section 30 is in contact with. That means it need not occupy space that can advantageously be used to accommodate active parts of the stator section. In particular, no space is subtracted from the active sides of the coils 4 (the third and fourth sides 43, 44) and the space between them is not invaded. This makes it possible to incorporate the cooling system easily and without loss of efficiency in a stator section 1 having a slotted core 2. This is clearly illustrated in the accompanying drawings. In one preferred embodiment, between the third sides 43 and/or between the fourth sides 44 of two consecutive coils 4 along the annular centre line 200 of the core 2, the core 2 comprises axial extensions 28 in the form of teeth protruding, respectively, from the first base surface 25 and/or from the second base surface 26 of the core 2 and extending from the inside cylindrical surface 20 to the outside cylindrical surface 21, each third and/or fourth side 43, 44 of any one coil 4 being flanked on both sides along the annular centre line 200 of the core 2 by a respective pair of axial extensions 28. In this embodiment, the active sides (the third and fourth sides 43, 44) are buried inside the slots formed between the teeth constituted by the axial extensions 28, to make a stator section with a structure of the slotted type, where the cooling system remains between the heads (the first and/or the second sides 41, 42) of the coils 4 and thus does not subtract space either from the conductors of the coil active sides or from the mass of the axial extensions 28 (which can thus fulfil, effectively and without loss of magnetic efficiency, their function as optimizers of magnetic flux concatenation with the coils 4). Depending on the orientation and structure of the coils 4 and/or of their sides, the axial extensions 28 can (preferably) protrude from the core 2 along a line parallel to the reference axis 22, extending transversally of this line (preferably along a radial line) from the inside cylindrical surface 20 to the outside cylindrical surface 21.

FIG. 2 (in the bottom right-hand quarter), 3, 12, 15 and 17 clearly illustrate configurations with stator sections 1 of the slotted type. FIGS. 1, 4a-4c, 5, 6, 11, 14 and 16, being plan views, illustrate configurations with stator sections 1 that might be either of the slotted or unslotted (slotless) type. FIG. 2 (in the bottom left-hand quarter) clearly illustrates a slotless configuration.

Generally speaking, in a coil 4 each side 41, 42, 43, 44 has a first side face 411, 421, 431, 441 adjoining a first opening 401 of the through hole 40 and a second side face 412, 422, 432, 442 adjoining a second opening 402 of the through hole 40 on the side of the through hole 40 opposite the first opening 401. If the cooling duct section 30 is adjacent to, and in contact with, the first side 41, it may be adjacent to, and in contact with, either the first side face 411 or the second side face 412 of the first side 41 itself. If the cooling duct section 30 is adjacent to, and in contact with, the second side 42, it may be adjacent to, and in contact with, either the first side face 421 or the second side face 422 of the second side 42 itself.

The electrical conductor, which is wound to form the coil 4, is in the form of a cable with a cross section of given size and shape and made from an electrically conductive material covered by a thin layer of electrically insulating material. In particular, the electrically conductive material is a metal (normally copper). Thus, the heat produced or present at a certain point of the head (first or second side 41, 42), in order to reach the cooling duct section 30 the head is adjacent to, must cross all the interposed layers of electrically insulating material.

Figure 9:
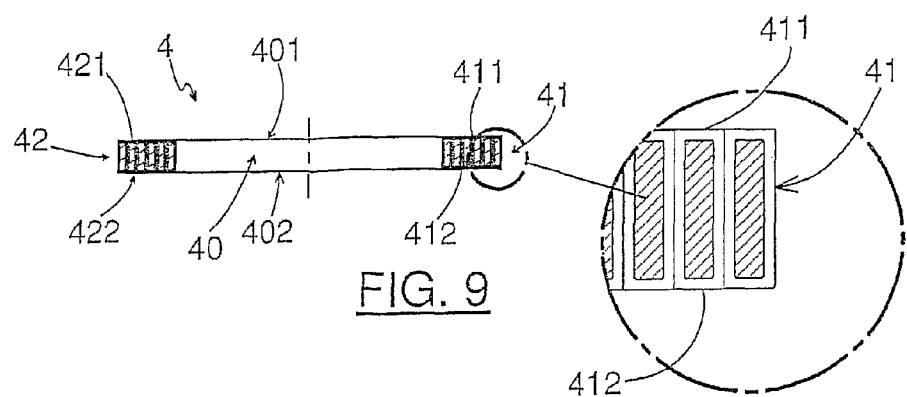
FIG. 9 is a schematic section of the coil of FIG. 8 in the plane labelled A-A in FIG. 8, and showing an enlarged detail.

Advantageously, as illustrated by way of example in FIG. 8, each coil 4 is made from a conductor in the form of a strip wound in a spiral around itself about a winding axis with a movement in a plane perpendicular to the winding axis. As illustrated by way of example in FIGS. 8 and 9, the plane which the strip lies in is oriented in such a way that at the first side face 411, 421, 431, 441 and at the second side face 412, 422, 432, 442, of any of the sides 41, 42, 43, 44 of the coil 4, there is only one layer of insulating material between the electrically conductive material the strip is made of and the outside of the coil. With this coil configuration, therefore, the presence of a cooling duct section 30 adjacent to, and in contact with, at least one of the two side faces 411, 412 of the outer head (that is, of the first side 41) or least one of the two side faces 421, 422 of the inner head (that is, of the second side 42) of the coil 4 makes the cooling of the conductor extremely effective.

Generally speaking, each cooling duct section 30 is a tubular element (having a cross section of suitable shape—circular, ellipsoidal, polygonal, and so on), which extends along a line that may be coiled, helical, curved, straight or other shape, provided that it is structured in such a way that the head or heads (the first and/or the second side 41 42) of the coil 4 adjacent to, and in contact with, a respective cooling duct section 30, can be cooled by the liquid coolant along its/their full extension from the first to the second reference plane 23, 24.

The tubular element may be simple or composite (in the latter case, its section may be composed of a plurality of sub-elements, also tubular, preferably parallel to each other).

At least one of the cooling duct sections 30 is adjacent to, and in contact with, both the sides of the coil 4 between which it is interposed. Thus, if this cooling duct section 30 is interposed between two first sides 41 of two consecutive coils 4 along the annular centre line 200 of the core, it will be adjacent to, and in contact with, both of the first sides 41 and, more specifically, with the first side face 411 of the first side 41 of one of the two consecutive coils 4 and, at the same time, with the second side face 412 of the first side 41 of the other of the two consecutive coils 4. This condition is shown for example in FIGS. 1, 2, 3, 4a, 4b, and 6 (in the latter case, for the cooling duct sections 30 located on the outside of the ring formed by the core 2). On the other hand, if the cooling duct section 30 is interposed between two second sides 42 of two consecutive coils 4 along the annular centre line 200 of the core, it will be adjacent to, and in contact with, both of the second sides 42 and, more specifically, with the first side face 421 of the second side 42 of one of the two consecutive coils 4 and, at the same time, with the second side face 422 of the second side 42 of the other of the two consecutive coils 4. This condition is shown in particular for the cooling duct sections 30 located on the inside of the ring formed by the core 2, illustrated in FIG. 6.

Conveniently, to maximize the heat exchange effect due to a single cooling duct section 30 (whether simple or composite), each of the cooling duct sections 30 is adjacent to, and in contact with, both of the coil 4 sides between which it is interposed.

Figure 4A:
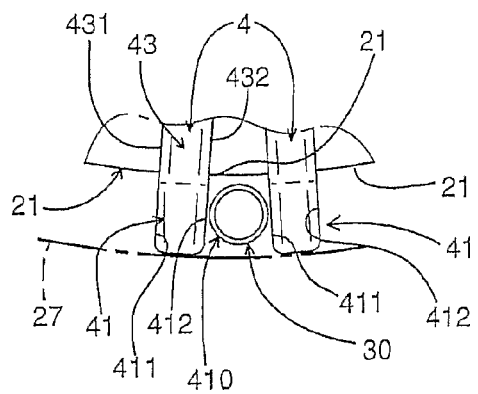
FIGS. 4a, 4b, 4c and 5 illustrate respective examples of the relation between the cooling duct sections and the coils.
Figure 4B:
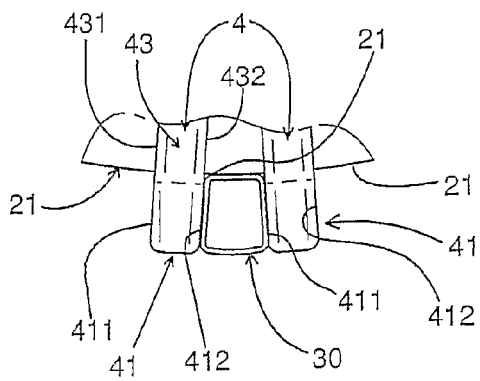
Figure 4C:
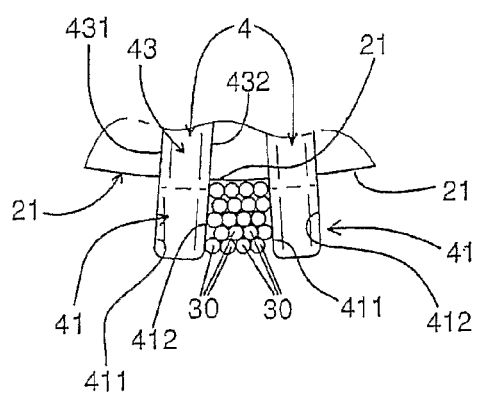

In one embodiment, shown in FIGS. 4a-4c, 6, the cooling duct sections 30 included between two consecutive coils 4 along the annular centre line 200 of the core 2 fill the space between the sides of the two coils 4 between which they are interposed. FIG. 4c shows a situation where either a single cooling duct section 30 consists of a bundle of adjacent tubular sub-elements that fill the space between the heads of two coils 4, or a group of cooling duct sections 30 is made in such a way as to fill the space.

The remaining empty space between one cooling duct section 30 and the respective side of the coil 4 (or adjacent cooling duct sections 30) may be filled by a suitable resin with good thermal conductivity properties.

In one embodiment of the invention:
  the first side 41 of each coil 4 extends along the outside cylindrical surface 21 from the first to the second reference plane 23, 24 according to a respective planar line of extension;
  the second side 42 of each coil 4 extends along the inside cylindrical surface 20 from the first to the second reference plane 23, 24 according to a respective planar line of extension;
  the third side 43 of each coil 4 extends consecutively with the first side 41 from the outside cylindrical surface 21 to the inside cylindrical surface 20 according to a respective planar line of extension;
  the fourth side 44 of each coil 4 extends consecutively with the second side 42 from the inside cylindrical surface 20 to the outside cylindrical surface 21 according to a respective planar line of extension;
  each cooling duct section 30 is tubular and extends from the first to the second reference plane 23, 24 according to a respective planar line of extension that keeps it adjacent to, and in contact with, a respective first or second side 41, 42 of a coil 4. Conveniently and for simplicity, each cooling duct section 30 may extend in a straight line at least between the first and second reference plane 23, 24.

The expression "planar line of extension" is used herein to mean a curve lying in one plane and along which a given object extends (and, more specifically, in the foregoing, one side of the coil and/or one duct section as the case may be).

In particular, in each coil 4, the line along which the first side 41 extends, the line along which the second side 42 extends, the line along which the third side 43 extends and the line along which the fourth side 44 extends each belongs to a respective plane parallel to the reference axis 22, or containing the reference axis 22. In particular, in each coil 4, the line along which the first side 41 extends, the line along which the second side 42 extends, the line along which the third side 43 extends and the line along which the fourth side 44 extends all belong to a single plane. This plane may be parallel to the reference axis 22. This plane may contain the reference axis 22, in which case, the coils 4 lie radially along the annular centre line 200 of the core 2 (as in the accompanying drawings). Preferably, each coil 4 lies in a plane 45 that contains the reference axis 22, the plane 45 where the coil 4 lies being defined as the plane that approximates the closed curve defined by the lines along which the four sides 41, 42, 43, 44 of the coil 4 extend.

The lines along which extend the sides 41, 42, 43, 44 of one coil 4 (and, hence, of the ring constituting the coil 4 itself) are illustrated in dot-dashed lines next to the respective coils 4 in the exploded view of FIG. 2, and in FIGS. 7 and 8.

In a preferred embodiment of the invention, the first side 41 of each coil 4 is adjacent to, and in contact with, at least one respective cooling duct section 30. That means the first side 41 of any coil 4 is adjacent to, and in contact with, at least one cooling duct section 30. That in turn means that at least the first side face 411 or the second side face 412 of the first side 41 of any coil 4 is adjacent to, and in contact with, at least one respective cooling duct section 30 of the plurality of cooling duct sections 30. In fact, a cooling duct section 30 that is adjacent to, and in contact with, the first side 41 of a given coil is necessarily interposed between that first side 41 and the first side 41 of the coil 4 that precedes or follows that given coil along the annular centre line 200 of the core 2, since it must be interposed between the first sides 41 of two consecutive coils 4 along the annular centre line 200 of the core 2.

Figure 5:
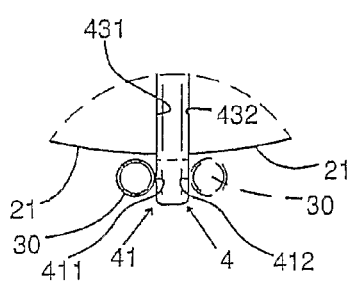

In this way, all the outer heads are cooled by direct contact with a respective cooling duct section 30. Advantageously, as illustrated in FIG. 5 (as well as in FIGS. 1, 3, 6 and 11) the first side 41 of each coil 4 is adjacent to, and in contact with, at least two respective cooling duct sections 30, a first cooling duct section 30 being adjacent to, and in contact with, the first side face 411 of the first side 41, and a second cooling duct section 30 being adjacent to, and in contact with, the second side face 412 of the first side 41.

Thus, each outer head is cooled by direct contact on both the side faces: the first side 41 of each coil 4 is always cooled on both its side faces 411, 412.

Generally speaking, advantageously, between the first sides 41 of any two consecutive coils 4 along the annular centre line 200 of the core 2 there is always interposed at least one cooling duct section 30 which is adjacent to, and in contact with, the first side 41 of one of two consecutive coils 4 and/or adjacent to, and in contact with, the first side 41 of the other of the two consecutive coils 4. Thus, the cooling duct section 30 is always in contact with only one of the two coils 4 between which it is interposed, or with the other of the two coils, or with both. In this embodiment, in a space 410 between the two first sides of any two consecutive coils 4 along the annular centre line 200 of the core 2 there is always at least one cooling duct section 30 of the plurality of cooling duct sections 30. This cooling duct section 30 is adjacent to, and in contact with, the first side face 411 of the first side 41 of one of the two coils 4 and/or adjacent to, and in contact with, the second side face 412 of the first side 41 of the other of the two coils 4. Generally speaking, a space 410 between the two first sides 41 of any two consecutive coils 4 along the annular centre line 200 of the core 2 corresponds to the space between the following elements: the first side face 411 of the first side 41 of one of the two coils 4; the second side face 412 of the first side 41 of the other of the two coils 4; the length of outside cylindrical surface 21 between the two coils 4; a portion of the maximum radial reference surface 27 occupied by the coils 4, surrounding the reference axis 22 and passing through the points of the coils 4 at the maximum distance from the reference axis 22 itself. In the case of stator sections 1 whose parts are arranged relative to each other according to common geometries, this reference surface 27 is also a cylindrical surface whose axis coincides with the reference axis 22.

Figure 3:
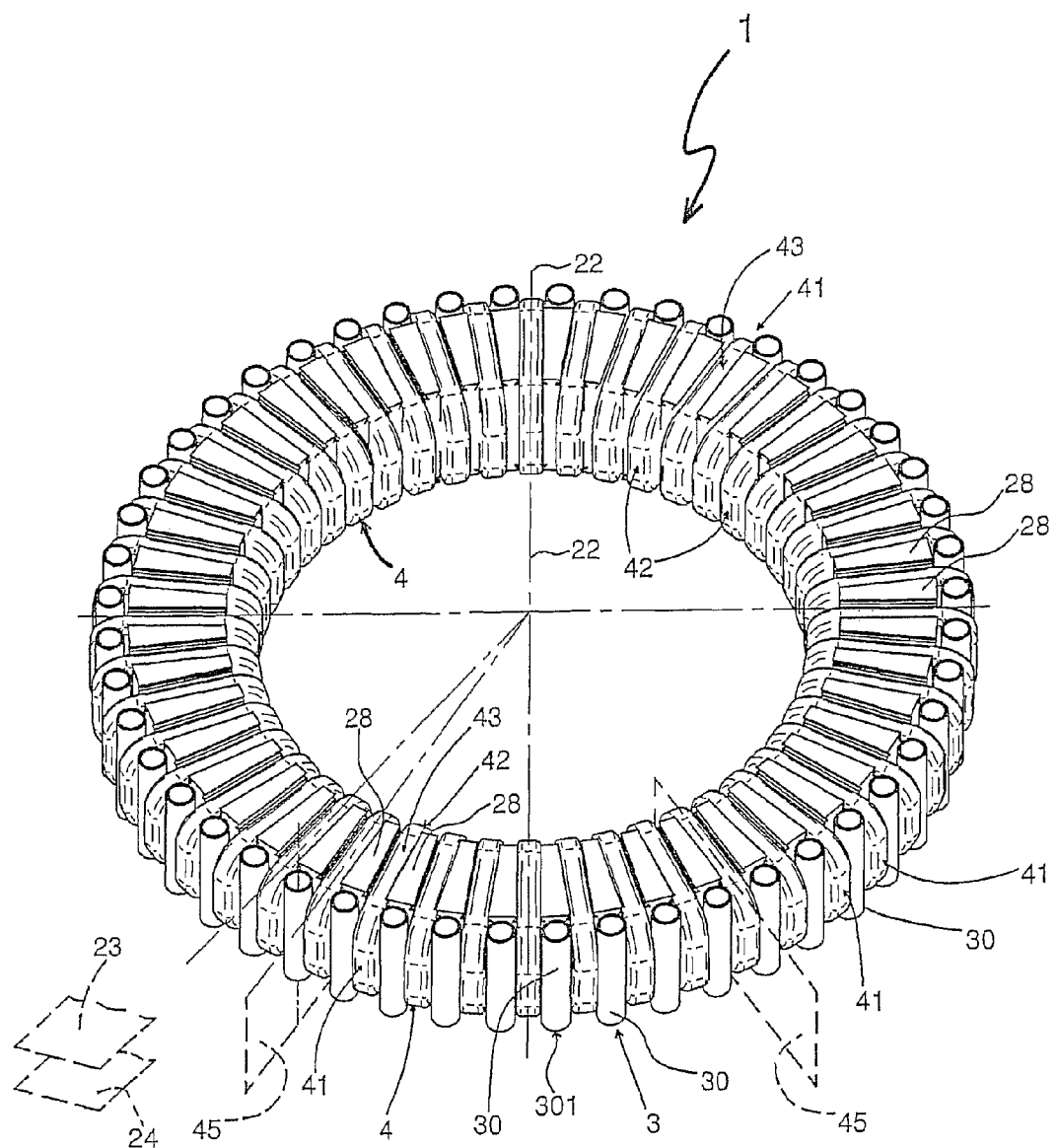
FIG. 3 is a schematic overall perspective view of the stator section for an electric machine with a slotted core, according to the embodiment of the invention illustrated in the bottom right-hand quarter of FIG. 2.
Figure 6:
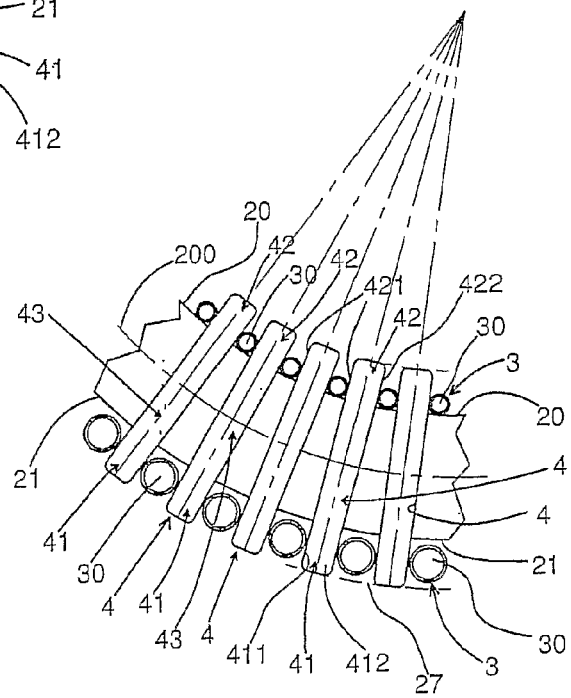
FIG. 6 illustrates a portion of an embodiment of the invention in a schematic plan view corresponding to that of FIG. 1.

The first side face and the second side face 411, 412 of the first side 41 of one coil 4 are on parts of the coil 4 mutually opposed along the annular centre line 200 of the core 2. The embodiments of the invention just described guarantee effective and thorough cooling of the outer heads (that is, of the first sides 41) of the coils 4. Obviously, what has been said with regard to the relation between the cooling duct sections 30 and the outer heads of the coils 4 could be repeated, using the corresponding terms, for the relation between the cooling duct sections 30 and the inner heads (that is, the second sides 42) of the coils 4. FIG. 6 shows an example of this on the inside of the core 2. If there is sufficient space on the inside of the core 2 (that is, on the inside cylindrical surface 20), the coils 4 might also be cooled by cooling duct sections 30 located in that region. Thus, if enough space is available, cooling might be effected, optionally, directly on the outer heads only (as shown in FIGS. 1, 2, 3, in the part shown in solid lines in FIG. 11, and in FIGS. 12, 14, 15, 16 and 17), or directly on the inner heads only (as shown by the part in dashed lines in FIG. 11) or directly on both the heads of the coils 4 (as shown in FIG. 6 and in FIG. 11).

In some cases, however, depending on the number of coils 4 on the core 2, their spacing along the annular centre line 200 of the core 2, and their orientation relative to radial planes (that is, planes containing the reference axis 22) although there may be enough space to accommodate at least one cooling duct section 30 between the first sides 41 of two consecutive coils 4 along the annular centre line 200 of the core 2, the space between the second sides 42 of two consecutive coils 4 may be insufficient for this purpose. When this is the case, the cooling duct sections 30 may be fitted only between the first sides 41 and not between the second sides 42 of the two consecutive coils 4. Indeed, generally speaking, while there is always enough space between the outer heads of two consecutive coils 4, that is not always the case for the inner heads of two consecutive coils 4. For this reason, preference is given first of all to direct cooling of the outer heads of the coils 4, while cooling of the inner heads is optionally provided if the application requires it and if there is enough space for it.

Moreover, if part of the cooling system is on the inside of the ring formed by the core 2, channelling the liquid coolant to and from the respective cooling duct sections 30, although possible, is more complicated. That is because the space on the inside of the inner cylindrical surface 20 is used to accommodate the rotating parts of the electric machine (for example, the rotor shaft). Further, it is difficult to locate structures such as liquid ducting between the rotor and the stator of an axial flux electric machine. Thus, in order to reach cooling duct sections 30 located on the inside of the core ring 2 it becomes necessary to feed the connecting ducts through the core 2 between the first and the second base surface 25, 26 of the core 2 itself, using a space between two consecutive coils 4. For example, if part of the cooling system is located on the outside of the ring formed by the core 2, that part of the cooling system on the outside—that is, the cooling duct sections 30 between the first sides 41 of consecutive coils 4—might be connected to the part of the system located on the inside—that is, the cooling duct sections 30 between the second sides 42 of consecutive coils 4.

It is however, obvious, that locating even just a part of the cooling system on the inside of the ring formed by the core 2 would complicate the system and the process to manufacture it. For this reason, too, preference is given first of all to direct cooling of the outer heads of the coils 4, while cooling of the inner heads is optionally provided if the application requires it and if there is enough space for it.

In one preferred embodiment of the invention, direct cooling is provided only on the outer heads. In this embodiment (see FIGS. 1, 2, 3, 12, 14, 15, 16 and 17, and only the part shown in solid lines in FIG. 11), each cooling duct section 30 is mounted at a radial distance from the reference axis 22 that is greater than or equal to the radius of the outside cylindrical surface 21, interposed between the first sides 41 of two consecutive coils 4 along the annular centre line 200 of the core 2.

The cooling duct sections 30 of the plurality of cooling duct sections 30 may be hydraulically connected to each other in several different ways, according to requirements, to enable the liquid coolant to circulate throughout the stator section 1.

Generally speaking, each cooling duct section 30 has a first and a second end 301, 302 to connect it, through respective inlet and outlet connecting sections, to other cooling duct sections 30, or to at least one liquid coolant supply inlet 33 (in turn connected to a liquid coolant source and/or tank), or to at least one liquid coolant outlet 34 (which must in turn be connected to a collection point, a tank, a drain or the like).

In one embodiment of the invention (illustrated for example in FIGS. 10b, 12 and 13), the cooling duct sections 30 of at least one group of cooling duct sections 30 of the plurality of cooling duct sections are hydraulically connected to each other in parallel, forming a parallel hydraulic group.

Figure 10A:
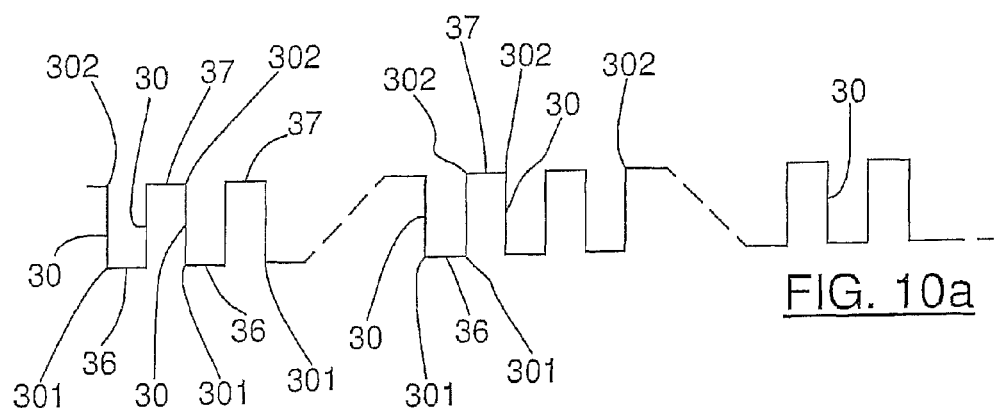
FIGS. 10a and 10b schematically illustrate possible forms of connection hydraulically in series or hydraulically in parallel between groups of cooling duct sections connected in series or in parallel.
Figure 10B:
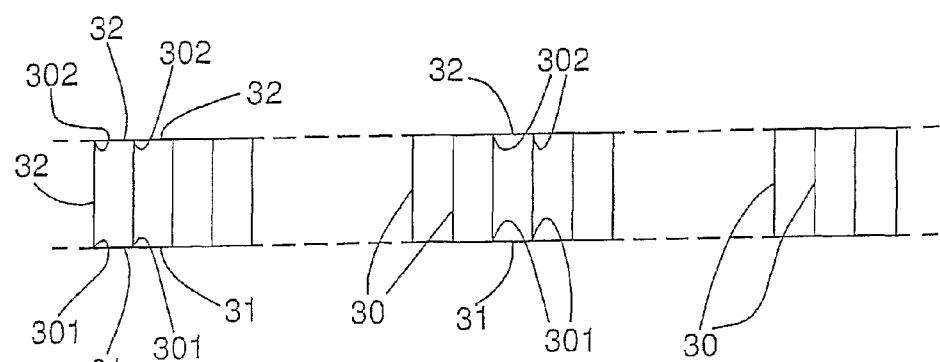

As shown in FIG. 10b, the plurality of cooling duct sections 30 may comprise a plurality of groups of cooling duct sections 30, in each of which the cooling duct sections 30 are connected to each other hydraulically in parallel, each of said groups forming a parallel hydraulic group.

In one parallel hydraulic group, the first ends 301 of the cooling duct sections 30 are connected to each other by first connecting duct sections 31, while the second ends 302 of the cooling duct sections 30 are connected to each other by second connecting duct sections 32. Each first and second connecting duct section 31, 32 may have a respective inlet, through which the liquid coolant flows into the parallel hydraulic group, and a respective outlet, through which the liquid coolant flows out of the parallel hydraulic group. The inlets and the outlets of the various parallel hydraulic groups may be connected to each other in series or in parallel, depending on requirements. FIG. 10b illustrates the various groups connected in parallel.

Figure 12:
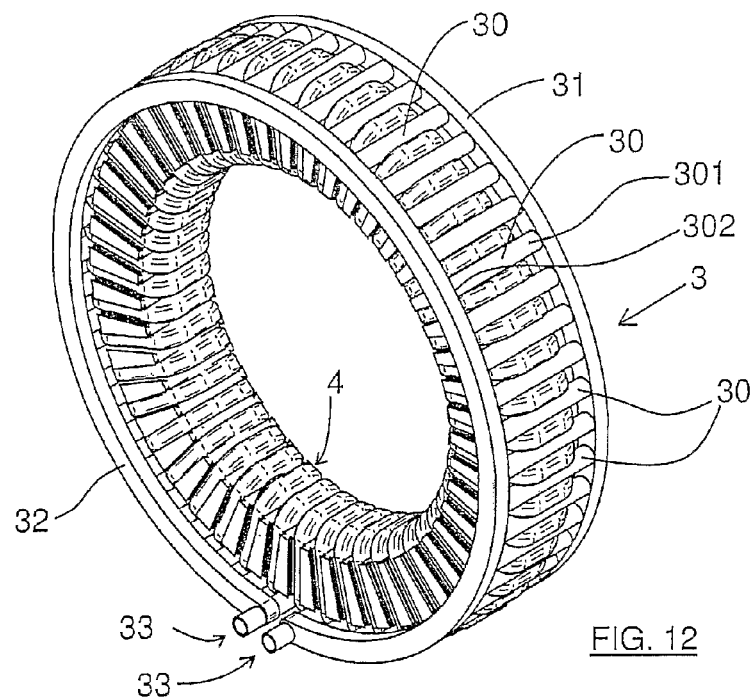
FIGS. 12 and 13 illustrate an embodiment of the invention with cooling duct sections connected hydraulically in parallel.
Figure 13:
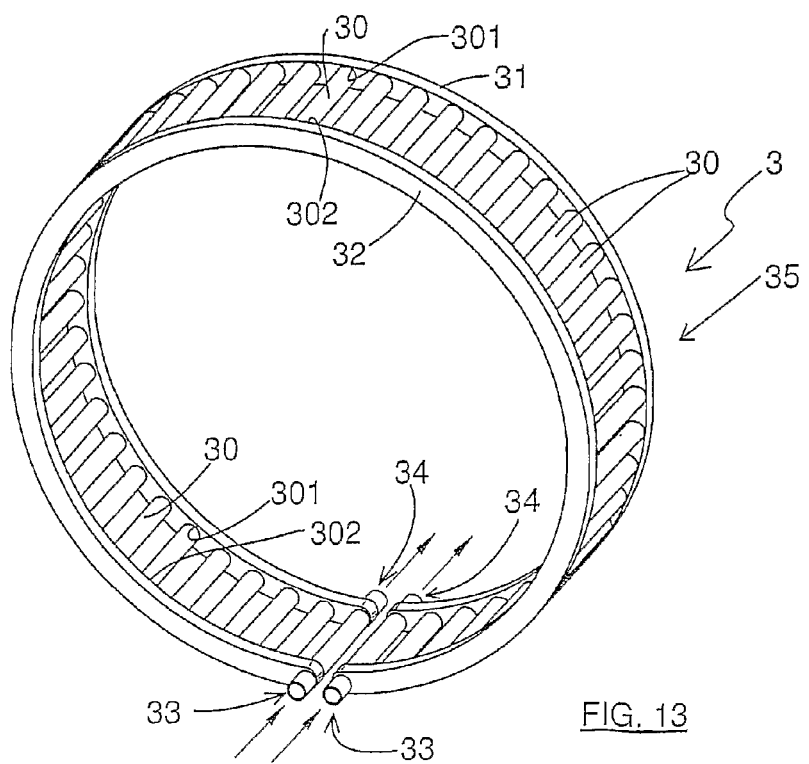

In an embodiment illustrated in FIGS. 12 and 13, all the cooling duct sections 30 of the plurality of cooling duct sections 30 are hydraulically connected to each other in parallel to form a single parallel hydraulic group.

The first ends 301 of the cooling duct sections 30 are connected to each other by respective first connecting duct sections 31 and the second ends 302 of the cooling duct sections 30 are connected to each other by respective second connecting duct sections 32. As in the previous case, each first and second connecting duct section 31, 32 has an inlet and an outlet, respectively. The cooling duct sections 30 and the respective first and second connecting duct sections 31, 32 form a cage 35. The cage 35 may be cylindrical in shape. The cooling duct sections 30 are aligned along directrices of the cylinder to describe the shape of the cage. The first and the second connecting duct sections 31, 32 are annular in shape and each is placed on a respective base of the cylinder (as shown in particular in FIG. 13).

In a specific embodiment (illustrated in particular in FIGS. 10a, 14, 15, 16 and 17), the cooling duct sections 30 of at least one group of cooling duct sections 30 of the plurality of cooling duct sections 30 are hydraulically connected to each other in series, forming a serial hydraulic group.

As shown in FIG. 10a, the plurality of cooling duct sections 30 may comprise a plurality of groups of cooling duct sections 30, in each of which the cooling duct sections 30 are connected to each other hydraulically in series, each of said groups forming a serial hydraulic group.

In one serial hydraulic group, the first end 301 of one cooling duct section 30 is connected to the first end 301 of the cooling duct section 30 that follows or precedes it in the serial group along the annular centre line of the core 2 by a third connecting duct section 36 while the second end 302 is connected to the second end 302 of the cooling duct section 30 that respectively precedes or follows it in the serial group along the annular centre line of the core 2 by a fourth connecting duct section 37.

A serial hydraulic group has a respective inlet, through which the liquid coolant flows into the serial hydraulic group, and a respective outlet, through which the liquid coolant flows out of the serial hydraulic group. The inlets and the outlets of the various serial hydraulic groups may be connected to each other in series or in parallel, depending on requirements. FIG. 10a illustrates the various groups connected in series.

Alongside groups of cooling duct sections 30 connected hydraulically to each other in series (serial hydraulic groups), there may also be one or more groups of cooling duct sections 30 connected hydraulically to each other in parallel (parallel hydraulic groups). Once suitably arranged, the serial hydraulic groups and the parallel hydraulic groups may in turn be connected to each other in series or in parallel, depending on requirements. The fact that the connecting duct sections 31 and 32 joining, respectively, the first ends 301 and the second ends 302 of the cooling duct sections 30 in a parallel hydraulic group are denoted by the terms "first duct" and "second duct", respectively, while the connecting duct sections 36 and joining, respectively, the first ends 301 and the second ends 302 of the cooling duct sections 30 in a serial hydraulic group are denoted by the terms "third duct" and "fourth duct", respectively, must not therefore be considered restrictive. The ordinal numerals "first", "second", "third" and "fourth" are used here only for convenience of reference solely to distinguish the connecting duct sections in a parallel hydraulic group from those in a serial hydraulic group. As stated, serial hydraulic groups (including connecting duct sections referred to as "third" and "fourth") can be formed even in the absence of parallel hydraulic groups (that is, groups that include "first" and "second" connecting duct sections).

Figure 14:
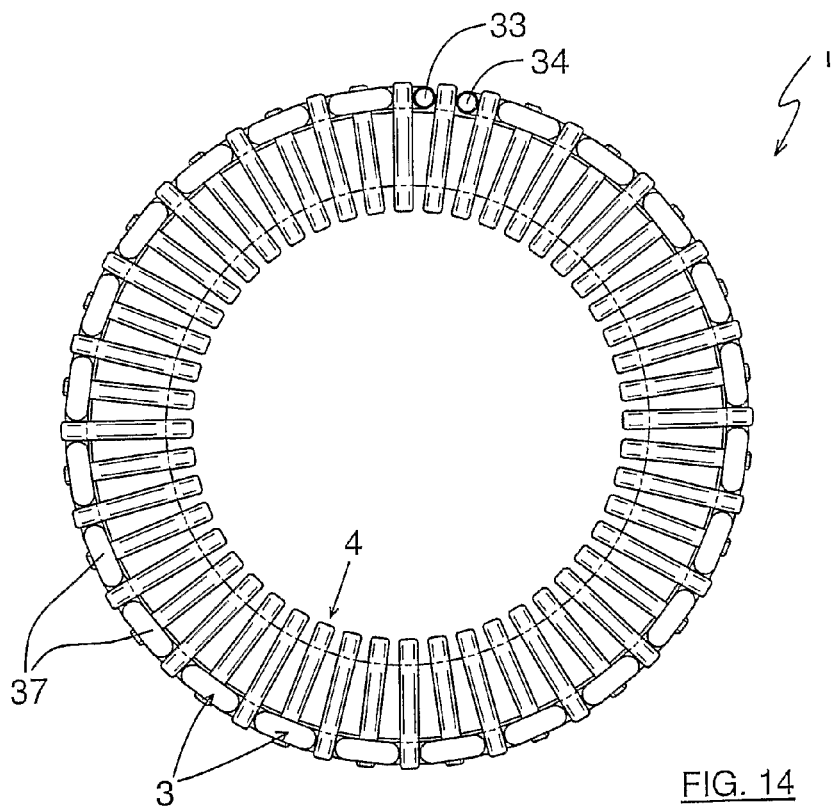
FIGS. 14 and 15 illustrate an embodiment of the invention with cooling duct sections connected hydraulically in series to form a cooling coil.
Figure 15:
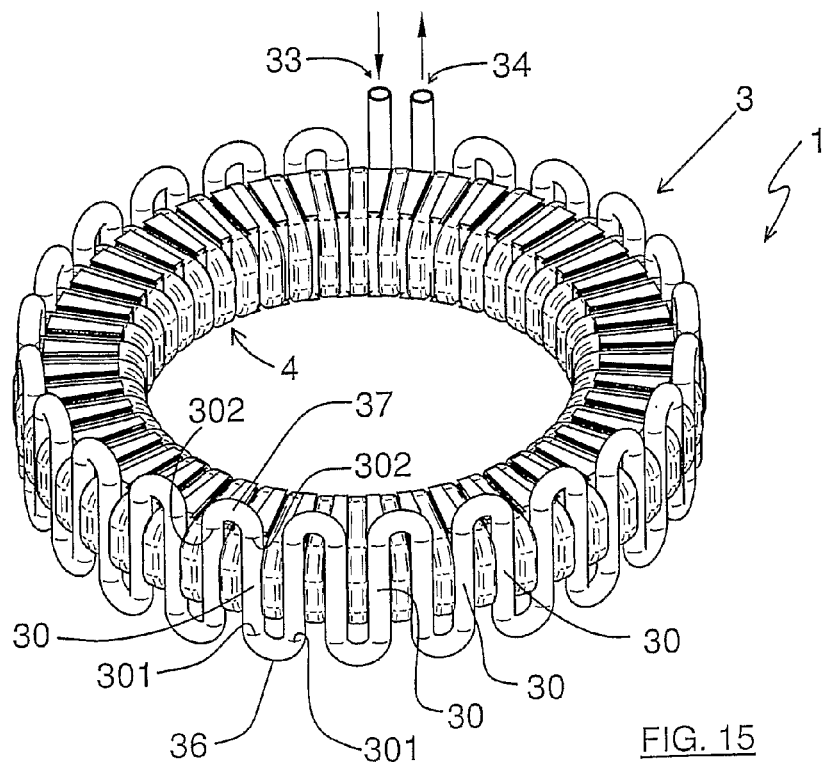

In an embodiment illustrated in FIGS. 14 and 15, all the cooling duct sections 30 of the plurality of cooling duct sections 30 are hydraulically connected to each other in series to form a single serial hydraulic group. In this embodiment, the inlet of the serial hydraulic group may receive liquid coolant from a cooling system supply, while the outlet may send the liquid coolant to a tank, drain or the like (or recycle it back to the cooling system supply).

Advantageously, the cooling duct sections 30 of at least one serial hydraulic group are connected to each other by the respective connecting duct sections 36, 37 to form a cooling coil corresponding to the serial hydraulic group.

Figure 16:
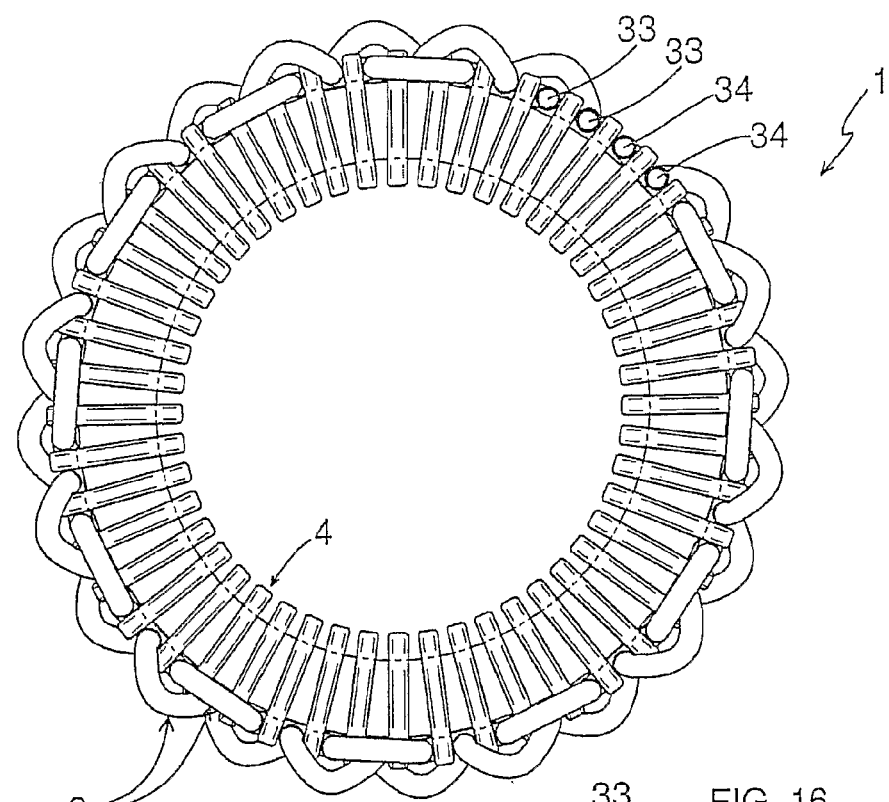
FIGS. 16 and 17 illustrate another embodiment of the invention with two groups of cooling duct sections connected hydraulically in series to form two cooling coils.
Figure 17:
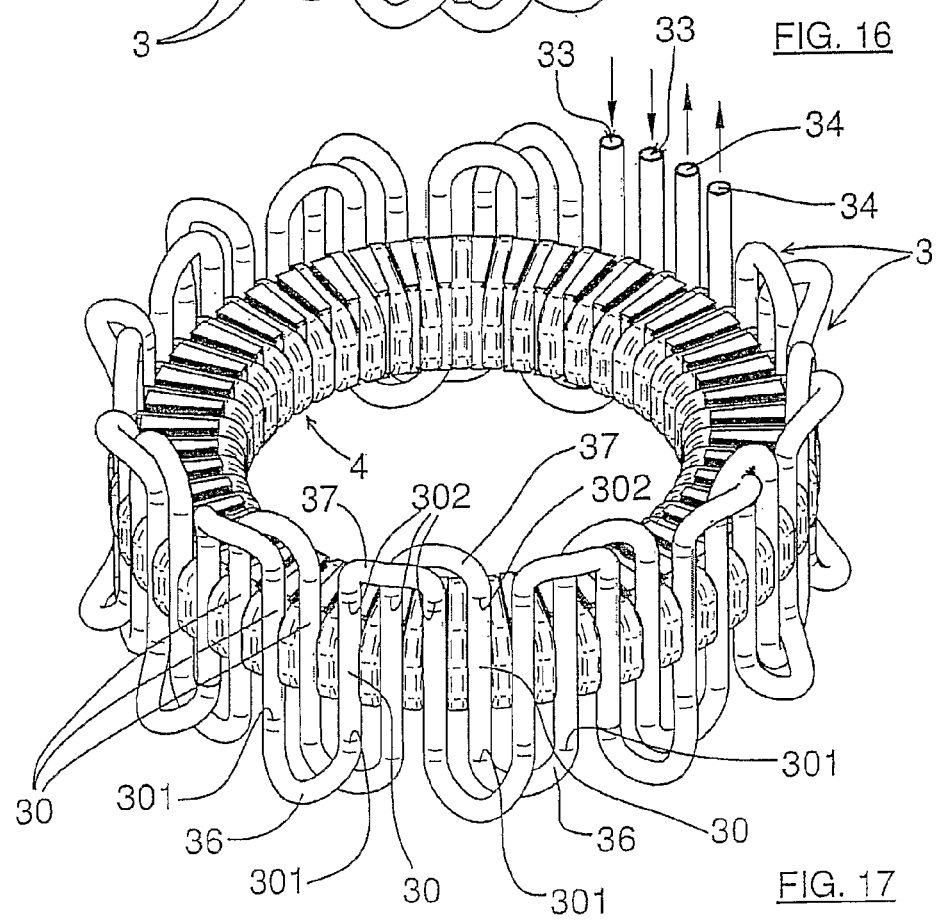

The cooling coil form of a group connected hydraulically in series may be very advantageous when the cooling duct sections 30 are tubular and extend substantially in a straight line. Hence, in this case, the cooling coil may be formed directly by simply bending a single tube of suitable length. The intrinsic flexibility of the material the tube is made of (for example, copper or the like) may be useful to adapt the pitch of the cooling coil to the spaces between the heads of the conductor coils 4 to be cooled by the cooling coil. Desirably, all the serial hydraulic groups might be made in this way. FIGS. 14 and 15 illustrate an example of this solution where all the cooling duct sections 30 form part of a single group connected hydraulically in series. FIGS. 16 and 17 illustrate a "a cooling coil" form of the same solution where the cooling duct sections 30 are divided into two serial hydraulic groups, both in the form of a cooling coil, the cooling duct sections 30 of the first serial hydraulic group being alternated with those of the second serial hydraulic group along the annular centre line 200 of the core 2.

Generally speaking, the cooling duct sections 30 can be divided into groups and can be connected to each other within the groups in different ways, depending on requirements. A single group of cooling duct sections 30 can be connected directly to the supply system (or to the drainage, recycling or recirculating system) of the liquid coolant, or it may be connected to one or more other groups of cooling duct sections 30.

Based on this principle, when the conductor coils 4 located on the core 2 are divided into groups and electrically connected to each other only within one group, cooling can be differentiated for each group of coils. One example of coil 4 grouping where this solution can be used is the case where each group of coils 4 corresponds to a specific electric phase of the axial flux electric machine in which the stator section 1 is fitted.

The coils 4 might for example be divided into a whole number n (greater than 1) of groups $G1, G2, \ldots, Gn$. In this case, any one of these groups $G1, G2, \ldots, Gn$ of coils 4 might be denoted by $Gi$ (where $i=1$, or $2, \ldots$, or $n$). The division of the coils 4 into groups might be effected in such a way that between any two consecutive coils 4 of any group $Gi$ along the annular centre line 200 of the core 2 there are $n-1$ interposed coils 4, one for each of the remaining $n-1$ groups. In particular, one coil 4 in the group $G1$ always precedes a coil 4 in the group $G2$ which in turn always precedes a coil 4 in the group $G3$, and so on.

The cooling duct sections 30 might be divided into groups to match the groupings of the coils 4. Hence, there will be a whole number n (greater than 1) of groups of cooling duct sections 30, each corresponding to a matching group $G1, G2, \ldots, Gn$ of coils 4, in such a way that each coil 4 of any group $Gj$ (where $j=1$, or $2, \ldots$, or $n$) of coils 4 has either the first side 41 or the second side 42 adjacent to, and in contact with, at least one cooling duct section 30 of the respective group of cooling duct sections 30.

Figure 11:
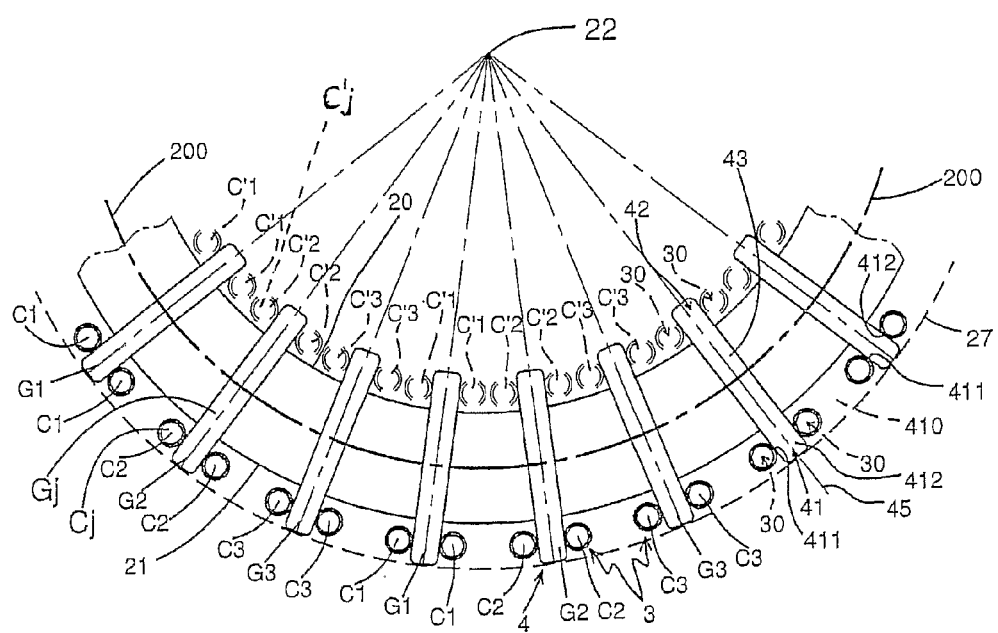
FIG. 11 illustrates, for one embodiment of the invention, a possibility of grouping the connections between connecting duct sections in relation to specific groups of coils.

The cooling duct sections 30 in a group of cooling duct sections 30 might:

be all located on the outside of the ring formed by the core 2 (that is, between the first sides 41 of two consecutive coils 4 along the annular centre line 200 of the core 2), this situation being drawn in solid lines in FIG. 11, where the symbol $Cj$ ($j=1$, or $2, \ldots$, or $n$, $n$ being equal to 3, for example) denotes a group of cooling duct sections 30 corresponding to the group $Gj$ ($j=1$, or $2, \ldots$, or $n$, $n$ being equal to 3, for example) of coils 4;

or be all located on the inside of the ring formed by the core 2 (that is, between the second sides 42 of two consecutive coils 4 along the annular centre line 200 of the core 2), this situation being drawn in dashed lines in FIG. 11, where the symbol $C'j$ ($j=1$, or $2, \ldots$, or $n$, $n$ being equal to 3, for example) denotes a group of cooling duct sections 30 corresponding to the group Gj (j=1, or 2, ..., or n, n n being equal to 3, for example) of coils 4;

or be divided into two sub-groups, in a first of which sub-groups (illustrated in solid lines in FIG. 11, where the symbol Cj in this case denotes the first sub-group of cooling duct sections 30 corresponding to the group Gj of coils 4), the cooling duct section 30 are all located on the outside of the ring formed by the core 2, while in a second of which sub-groups (illustrated in dashed lines in FIG. 11, where the symbol C'j in this case denotes the second sub-group of cooling duct sections 30, corresponding to the group Gj of coils 4), the cooling duct sections 30 are all located on the inside of the ring formed by the core 2 (the cooling duct sections in each sub-group being all connected to each other but not necessarily to those of the other sub-group).

If the cooling duct sections 30 are located on both the outside and the inside of the ring formed by the core 2, they may be divided into a number of groups greater than the whole number n (greater than 1) of groups of coils 4, so that the cooling duct sections 30 of any one group may be either all on the outside or all on the inside of the core ring 2.

More specifically, FIG. 11 illustrates a cooling structure divided according to several groups of coils 4, with reference for example (and without limiting the invention) to a situation where the coils 4 are divided into three groups G1, G2, G3 (each coil 4 shown in FIG. 11 being denoted by the label of its respective group).

The parts drawn in solid lines represent a plurality of cooling duct sections 30 all located on the outside of the core ring 2 (in the space between the first sides 41 of two consecutive coils 4). The first side 41 of each coil 4 is in contact with two cooling duct sections 30 (one for the first side face 411 and one for the second side face 412 of the first side 41). These cooling duct sections 30 located on the outside of the ring formed by the core 2 are divided into three groups C1, C2, C3, each coil 4 in each group G1, G2 or G3 corresponding to a pair of cooling duct sections 30 belonging to the group C1, the group C2 or the group C3, respectively. In FIG. 11, each cooling duct section 30 is identified by the label of the corresponding group. By keeping separate the cooling liquid flow and/or temperature controls in each group of cooling duct sections 30 it is possible to differentiate the cooling of the first sides 41 of the coils of the three groups G1, G2, G3.

The parts drawn in dashed lines represent a plurality of cooling duct sections 30 all located on the inside of the ring formed by the core 2 (in the space between the second sides 42 of two consecutive coils 4). The second side 42 of each coil 4 is in contact with two cooling duct sections 30 (one for the first side face 421 and one for the second side face 422 of the second side 42). These cooling duct sections 30 located on the inside of the ring formed by the core 2 are divided into three groups C'1, C'2, C'3, each coil 4 in each group G1, G2 or G3 corresponding to a pair of cooling duct sections 30 belonging to the group C'1, the group C'2 or the group C'3, respectively. In FIG. 11, each cooling duct section 30 is identified by the label of the corresponding group. By keeping separate the cooling liquid flow and/or temperature controls in each group of cooling duct sections 30 it is possible to differentiate the cooling of the second sides 42 of the coils of the three groups G1, G2, G3.

The fact that each group of cooling duct sections 30 is provided with a pair of cooling duct sections 30 for each coil 4 head (one cooling duct section 30 on each side face) is a non-limiting embodiment. The head of each coil might have only one cooling duct section 30 in contact with it.

Preferably, as stated, the cooling duct sections 30 are located only on the outside of the ring formend by the core 2. It is, however, possible (though somewhat complicated, as already stated) to make cooling structures with cooling duct sections 30 all on the inside of the ring formed by the core 2, or structures with cooling duct sections 30 both on the outside and on the inside of the ring formed by the core 2, depending on available space and/or on requirements. The invention brings important advantages.

First of all, it provides an extremely effective cooling system where the coil heads all have cooling duct sections running close them to create a direct cooling effect. Secondly, the cooling system can be accommodated in the stator section of the axial flux electric machine without in any way reducing the electromagnetic efficiency of the machine.

The cooling system is extremely versatile and can be adapted to suit axial flux electric machines of all types. The cooling duct sections can be made very easily in at least one of the embodiments of the invention.

Furthermore, the system makes it possible to differentiate the type and/or intensity of cooling for different groups of coils.

The invention described may be modified and adapted in several ways without thereby departing from the spirit of the inventive concept that characterises it.

Moreover, all the details of the invention may be substituted by technically equivalent elements.

In practice, the embodiments of the invention may be made from any material, and in any size, depending on requirements.

The invention claimed is:

1. A stator section for an axial flux electric machine with liquid cooling system, comprising:
   a toroidal core having an inside cylindrical surface and an outside cylindrical surface coaxial with each other along a reference axis that is to be made coincide with the axis of rotation of a rotor section of an axial flux electric machine;
   liquid cooling means;
   a plurality of electrical conductor coils spaced from each other and distributed along the annular centre line of the core;
   where:
   each coil: has the shape of a solid with a hole passing through it, can be divided into four consecutive sides running round the through hole, is placed around the core with a first side of it lying on the outside cylindrical surface, a second side of it lying on the inside cylindrical surface and a third and fourth side of it lying transversally to the first and second sides, wherein
      the liquid cooling means comprise a plurality of cooling duct sections through which a liquid coolant can flow;
      each cooling duct section is in one of the two following, alternative conditions: either it is interposed between the first sides of two consecutive coils along the annular centre line of the core at a radial distance from the reference axis greater than or equal to the radius of the outside cylindrical surface, or it is interposed between the second sides of two consecutive coils along the annular centre line of the core at a radial distance from the reference axis less than or equal to the radius of the inside cylindrical surface;
      each cooling duct section produces a movement of the liquid coolant from a first to a second reference plane, both perpendicular to the reference axis, spaced from each other along the reference axis and corresponding, respectively, to at least one portion of a first base surface of the core and at least one portion of a second base surface of the core;

at least the first or the second side of each coil is adjacent to and in contact with at least one respective cooling duct section of the plurality of cooling duct sections, wherein each coil is an individual coil for which the first, second, third and fourth side extend along lines lying on a same plane, and wherein the toroidal core has a cylindrical outside lateral surface and a cylindrical inside lateral surface, coaxial with each other along an axis that coincides with the axis of rotation of the rotor section, and is made by a metal strip wound spirally on itself around said axis.

2. The stator section for an electric machine according to claim 1, wherein each cooling duct section is mounted at a radial distance from the reference axis greater than or equal to the radius of the outside cylindrical surface and is interposed between the first sides of two consecutive coils along the annular centre line of the core.

3. The stator section for an electric machine according to claim 1, wherein the cooling duct sections included between two consecutive coils along the annular centre line of the core fill the space between the sides of the two coils between which they are interposed.

4. The stator section for an electric machine according to claim 1, wherein at least one of the cooling duct sections is adjacent to, and in contact with, both of the coil sides between which it is interposed.

5. The stator section for an electric machine according to claim 4, wherein each of the cooling duct sections is adjacent to, and in contact with, both of the coil sides between which it is interposed.

6. The stator section for an electric machine according to claim 1, wherein the first side of each coil is adjacent to, and in contact with, at least one respective cooling duct section.

7. The stator section for an electric machine according to claim 1, wherein the first side of each coil is adjacent to, and in contact with, at least two respective cooling duct sections, a first cooling duct section being adjacent to, and in contact with, a first side face of the first side adjoining a first opening of the through hole, and a second cooling duct section being adjacent to, and in contact with, a second side face of the first side adjoining a second opening of the through hole on the side of the through hole opposite the first opening.

8. The stator section for an electric machine according to claim 1, wherein between the first sides of any two consecutive coils along the annular centre line of the core there is always interposed at least one cooling duct section which is adjacent to, and in contact with, the first side of one of two consecutive coils and/or adjacent to, and in contact with, the first side of the other of the two consecutive coils.

9. The stator section for an electric machine according to claim 1, wherein:

the first side of each coil extends along the outside cylindrical surface from the first to the second reference plane according to a respective planar line of extension;

the second side of each coil extends along the inside cylindrical surface from the first to the second reference plane according to a respective planar line of extension;

the third side of each coil extends consecutively with the first side from the outside cylindrical surface to the inside cylindrical surface according to a respective planar line of extension;

the fourth side of each coil extends consecutively with the second side from the inside cylindrical surface to the outside cylindrical surface according to a respective planar line of extension;

each cooling duct section is tubular and extends from the first to the second reference plane according to a respective planar line of extension that keeps it adjacent to, and in contact with, a respective first or second side of a respective coil.

10. The stator section for an electric machine according to claim 9, wherein each cooling duct section extends in a straight line at least between the first and the second reference plane.

11. The stator section for an electric machine according to claim 9, wherein in each coil, the line along which the first side extends, the line along which the second side extends, the line along which the third side extends and the line along which the fourth side extends each belongs to a respective plane parallel to the reference axis, or containing the reference axis.

12. The stator section for an electric machine according to claim 9, wherein in each coil, the line along which the first side extends, the line along which the second side extends, the line along which the third side extends and the line along which the fourth side extends all belong to a single plane.

13. The stator section for an electric machine according to claim 1, wherein: each coil lies in a plane that contains the reference axis, the plane where the coil lies being defined as the plane that approximates the closed curve defined by the lines along which the four sides of the coil extend.

14. The stator section for an electric machine according to claim 1, wherein each coil is made from a conductor in the form of a strip wound in a spiral around itself about a winding axis with a movement in a plane perpendicular to the winding axis.

15. The stator section for an electric machine according to claim 1, wherein the cooling duct sections of at least one group of cooling duct sections of the plurality of cooling duct sections are connected to each other hydraulically in parallel, forming a parallel hydraulic group.

16. The stator section for an electric machine according to claim 15, wherein the plurality of cooling duct sections comprises a plurality of groups of cooling duct sections, in each of which the cooling duct sections are connected to each other hydraulically in parallel, each of said groups forming a parallel hydraulic group.

17. The stator section for an electric machine according to claim 15, wherein all cooling duct sections of the plurality of cooling duct sections are connected to each other hydraulically in parallel to form a single parallel hydraulic group.

18. The stator section for an electric machine according to claim 1, wherein between the third sides and/or between the fourth sides of two consecutive coils along the annular centre line of the core, the core comprises axial extensions in the form of teeth protruding, respectively, from the first base surface and/or from the second base surface of the core and extending from the inside cylindrical surface to the outside cylindrical surface, each third and/or fourth side of any one coil being flanked on both sides along the annular centre line of the core by a respective pair of axial extensions.

19. A stator section for an axial flux electric machine with liquid cooling system, comprising:

a toroidal core having an inside cylindrical surface and an outside cylindrical surface coaxial with each other along a reference axis that is to be made coincide with the axis of rotation of a rotor section of an axial flux electric machine;

liquid cooling means;
a plurality of electrical conductor coils spaced from each other and distributed along the annular centre line of the core;
where:
 each coil: has the shape of a solid with a hole passing through it, can be divided into four consecutive sides running round the through hole, is placed around the core with a first side of it lying on the outside cylindrical surface, a second side of it lying on the inside cylindrical surface and a third and fourth side of it lying transversally to the first and second sides, wherein:
  the liquid cooling means comprise a plurality of cooling duct sections through which a liquid coolant can flow;
  each cooling duct section is in one of the two following, alternative conditions: either it is interposed between the first sides of two consecutive coils along the annular centre line of the core at a radial distance from the reference axis greater than or equal to the radius of the outside cylindrical surface, or it is interposed between the second sides of two consecutive coils along the annular centre line of the core at a radial distance from the reference axis less than or equal to the radius of the inside cylindrical surface;
  each cooling duct section produces a movement of the liquid coolant from a first to a second reference plane, both perpendicular to the reference axis, spaced from each other along the reference axis and corresponding, respectively, to at least one portion of a first base surface of the core and at least one portion of a second base surface of the core;
  at least the first or the second side of each coil is adjacent to and in contact with at least one respective cooling duct section of the plurality of cooling duct sections,
wherein the cooling duct sections of at least one group of cooling duct sections of the plurality of cooling duct sections are connected to each other hydraulically in series, forming a serial hydraulic group.

20. The stator section for an electric machine according to claim 19, wherein the plurality of cooling duct sections comprises a plurality of groups of cooling duct sections, in each of which the cooling duct sections are connected to each other hydraulically in series, each of said groups forming a serial hydraulic group.

21. The stator section for an electric machine according to claim 19, wherein the cooling duct sections of at least one serial hydraulic group are connected to each other by respective connecting duct sections to form a cooling coil corresponding to the serial hydraulic group.

22. A stator section for an axial flux electric machine with liquid cooling system, comprising:
a toroidal core having an inside cylindrical surface and an outside cylindrical surface coaxial with each other along a reference axis that is to be made coincide with the axis of rotation of a rotor section of an axial flux electric machine;
liquid cooling means;
a plurality of electrical conductor coils spaced from each other and distributed along the annular centre line of the core;
where:
 each coil: has the shape of a solid with a hole passing through it, can be divided into four consecutive sides running round the through hole, is placed around the core with a first side of it lying on the outside cylindrical surface, a second side of it lying on the inside cylindrical surface and a third and fourth side of it lying transversally to the first and second sides, wherein:
  the liquid cooling means comprise a plurality of cooling duct sections through which a liquid coolant can flow;
  each cooling duct section is in one of the two following, alternative conditions: either it is interposed between the first sides of two consecutive coils along the annular centre line of the core at a radial distance from the reference axis greater than or equal to the radius of the outside cylindrical surface, or it is interposed between the second sides of two consecutive coils along the annular centre line of the core at a radial distance from the reference axis less than or equal to the radius of the inside cylindrical surface;
  each cooling duct section produces a movement of the liquid coolant from a first to a second reference plane, both perpendicular to the reference axis, spaced from each other along the reference axis and corresponding, respectively, to at least one portion of a first base surface of the core and at least one portion of a second base surface of the core;
  at least the first or the second side of each coil is adjacent to and in contact with at least one respective cooling duct section of the plurality of cooling duct sections, wherein all cooling duct sections of the plurality of cooling duct sections are connected to each other hydraulically in series to form a single serial hydraulic group.

23. The stator section for an electric machine according to claim 22, wherein the cooling duct sections of at least one serial hydraulic group are connected to each other by respective connecting duct sections to form a cooling coil corresponding to the serial hydraulic group.

* * * * *